July 5, 1960
E. MOSER
2,943,914
METHOD OF RECOVERING FLUORINE FROM WASTE GASES
Filed March 24, 1958
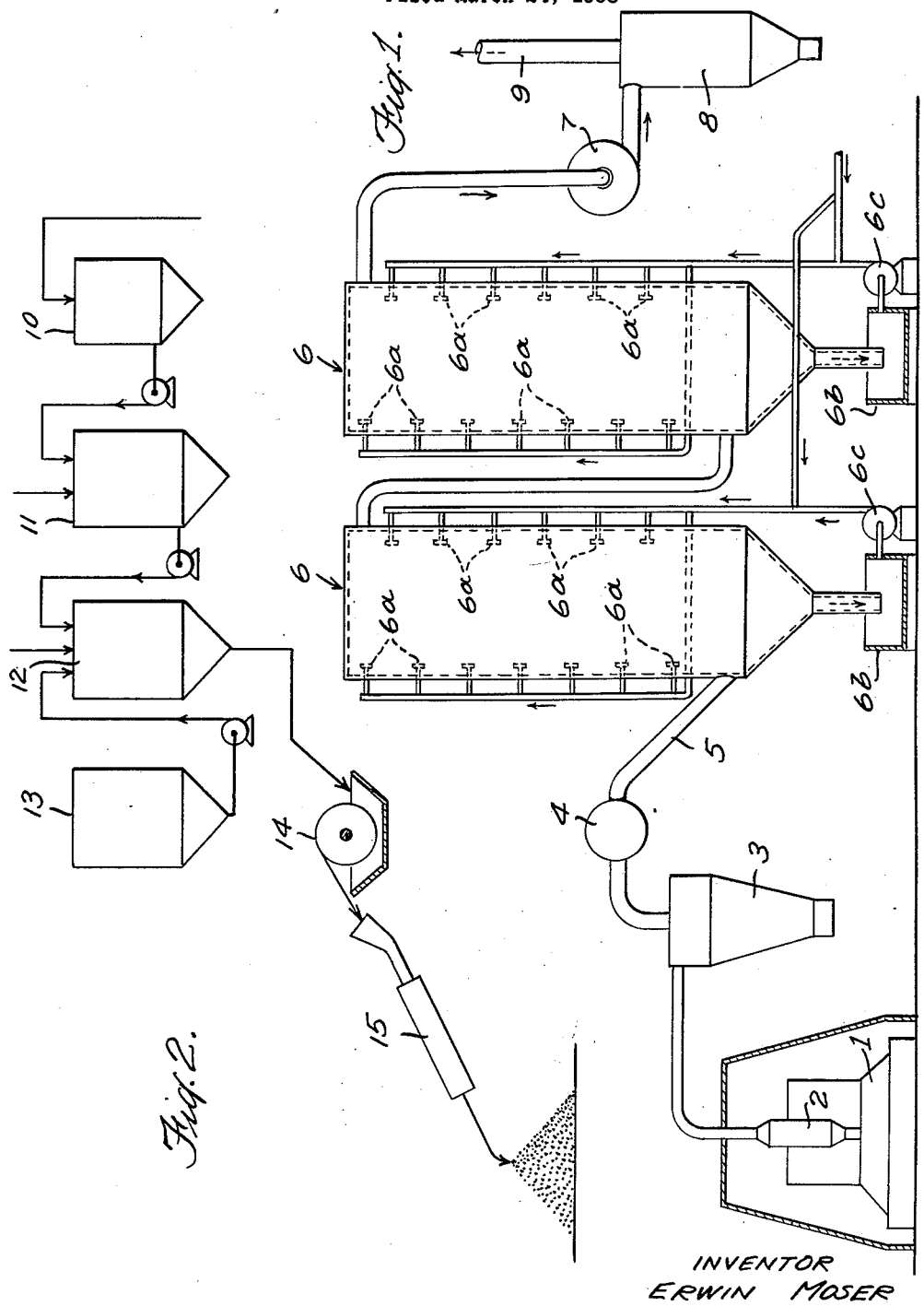
INVENTOR
ERWIN MOSER
BY
Morrison, Kennedy & Campbell
ATTORNEYS

United States Patent Office 2,943,914
Patented July 5, 1960

2,943,914
METHOD OF RECOVERING FLUORINE FROM WASTE GASES

Erwin Moser, Rheinfelden, Baden, Germany, assignor to Aluminium - Industrie - Aktien - Gesellschaft, Chippis, Switzerland, a joint stock company of Switzerland Filed Mar. 24, 1958, Ser. No. 723,373

Claims priority, application Switzerland Apr. 1, 1957

2 Claims. (Cl. 23—88)

The present invention relates to a method of recovering fluorine from waste gases.

In the electrolytic production of aluminum in a fused electrolyte, waste gases escape containing fluorine in a considerable amount, and formed by decomposition of the cryolite which is the chief constituent of the electrolyte. Also, in other chemical works, fluorine containing waste gases escape.

Several methods are known for recovering the valuable fluorine from these waste gases and for using the recovered fluorine to produce cryolite or other sodium aluminum double fluorides.

One of these known methods consists in washing the waste gases in spray towers with a solution of sodium carbonate or caustic soda, thereby forming a solution of sodium fluoride. From this solution, cryolite may be produced by adding aluminate liquor and passing carbon dioxide in at the same time. The absorption of the fluorine in the washing solution presents no difficulties, but precipitating cryolite from this solution, produces generally only a crude product which is of low value because of its high contamination with sodium sulphate. Furthermore, the cryolite precipitated in this way manifests poor filterability. Also, in certain localities, the production of the necessary aluminate liquor is too expensive to make the process economically feasible.

It is the object of this invention to provide a method for producing cryolite or other sodium aluminum double fluorides of high purity and good filterability from waste gases, by the use of cheap raw materials easily available according to the locality.

According to the present invention, the waste gases are washed with water, yielding a solution of hydrofluoric acid. This solution is reacted with sodium and aluminum containing materials, whereby cryolite or some other sodium aluminum double fluoride is precipitated.

The absorption of fluorine or hydrofluoric acid in water may be performed easily and nearly completely in simple, well-known spray towers. To avoid damages due to corrosion, all parts of the plant coming in contact with the acid solution must be protected by a coat of rubber or a synthetic resin. Advantageously, the hydrofluoric acid solution obtained is circulated until its concentration amounts to 3 to 10%. In this concentration range, the sulphur dioxide in the waste gases is only poorly absorbed, which fact is of great importance to assure purity in the cryolite to be recovered. When the washing solution has reached the desired concentration, it is reacted with sodium and aluminum containing materials, suitably in a separate reaction vessel. In this vessel is added, for example, a solution of sodium aluminate to the washing solution to effect a reaction according to the equation:

$$Na_3AlO_3 + 6HF = Na_3AlF_6 + 3H_2O$$

Instead of aluminate liquor, alumina hydrate or an aluminum containing waste product as dross or skimmings may be added, whereby a solution of $AlF_3$ or $AlF_3$-hydrate is formed. This solution is afterwards reacted with a sodium fluoride solution precipitating sodium aluminum double fluoride. The NaF necessary for the formation of the double fluoride may also be produced by adding sodium, for example in the form of $Na_2CO_3$ or NaOH to a $AlF_3$-solution containing HF in excess.

The added NaF-solution may be obtained by leaching out furnace wastes and reacting the resulting solution containing $Na_2CO_3$ and NaOH with a HF-solution. The leaching solution may also be added directly to a HF acid $AlF_3$-solution, whereby NaF is formed, precipitating at the same time the double fluoride. The expression "furnace wastes" means the material broken out of defective carbon linings in electrolytic cells for the production of aluminum. These wastes contain beside carbon considerable amounts of $Na_2CO_3$, NaF, cryolite and $Al_2O_3$. According to the composition of the wastes and to the leaching method employed, the relation between the contents of $Na_2CO_3$, NaOH, NaF and Na-aluminate in the solution differs.

The NaF-solution necessary for the precipitation of sodium aluminum double fluorides from the $AlF_3$-solution may also be produced in known manner by washing a part of the fluorine containing waste gases in a separate installation with a $Na_2CO_3$- or NaOH-solution or with the leaching solution of the furnace wastes.

Furthermore, the NaF-solution may be obtained by absorbing the fluorine of the waste gases in two steps. In the first step, the fluorine is washed out incompletely with water and in the second step, the washing process is completed with a sodium alkaline solution or the two steps may be carried out in the reverse order.

The method according to the present invention may be carried out, for example, in the following way:

(1a) The fluorine containing waste gases are washed in plastic spray towers with water in order to obtain a solution containing hydrofluoric acid. The solution is circulated until the concentration of HF amounts to about 10%.

(1b) In the circulating washing solution are then introduced alumina hydrate or aluminum scraps until a $AlF_3$-solution of about 7% is obtained.

(2) Furnace wastes are leached out with circulating water. The resulting solution contains about

|  | G./l. |
|---|---|
| $Na_2CO_3$ | 40 |
| NaF | 12 |
| $AlF_3$ | 7 |

(3) The alkaline leaching solution from the furnace wastes is slowly introduced into the acid $AlF_3$-solution until a pH-value of 5 to 6 is reached. One liter of the acid $AlF_3$-solution necessitates about 3.5 liter of the alkaline leaching solution. Cryolite is precipitated in an easily decantable and filterable form with a yield of up to about 98% and a purity of about 99%.

Another way for carrying out the method according to the present invention is described in connection with the accompanying drawing, in which Fig. 1 shows diagrammatically a plant for carrying out the method of producing the HF solution from the waste gases; and Fig. 2 shows diagrammatically a plant for precipitating the cryolite from the HF solution obtained from the plant of Fig. 1.

Referring to Fig. 1, the electrolytic cells with self-baking anodes and vertical contact studs are provided with a casing 1 for collecting the waste gases. In the combustion chamber 2, carbon monoxide and tar products are burnt. The cyclone 3 deposits dust and carbon black. In the collecting pipe 4, the waste gases or a series of, for example, 22 cells are assembled and the waste gases therefrom are led together into the two spray towers 6.

The temperature of the gas is 300 to 400° C. directly after the combustion chamber 2 and drops down to about 80° C. because of natural cooling. In a special corrosion-resistant cooling pipe 5, the temperature of the gas is lowered down to 30–40° C. by spraying in cold water, so that the spray towers which are made from a synthetic resin do not suffer any damage.

Each tower 6 is provided with a number of spray nozzles 6a, for example, thirty-six, also made from synthetic resin. The waste gases are delivered to the bottom of the first spray tower 6, flow upwardly therein, and then pass to the bottom of the second tower 6. While the gas flows upwardly in each tower, it is sprayed intensively with water from the nozzles 6a. The water containing HF in solution is discharged from the bottom of each tower 6 into a tank 6b and recirculated by the pump 6c back to the nozzles 6a, this recirculation being continued until the HF solution discharged from the tower has the required concentration up to 10%.

The washing may also be made continuously by applying the counterflow principle, fresh water being introduced into the last tower and being drawn off from the first tower with the desired concentration.

A ventilator 7 which aspirates the gases through the whole installation is arranged behind the spray towers 6, so that it is contaminated as little as possible. The waste gases, freed from practically all fluorine and from other harmful constitutents are blown into the drop separator 8 and out through the chimney 9 into the atmosphere.

The analysis of the gases before and after the absorption treatment of Fig. 1 gives the following average results:

|  | crude gas mg./m.$^3$ (N.T.P.) | end gas mg./m.$^3$ (N.T.P.) | efficiency, percent |
| --- | --- | --- | --- |
| fluorine | 663 | 4.6 | 99.3 |
| sulphur | 343 | 163 | 52.5 |
| dust | 475 | 208 | 56.6 |
| tar | 84 | 32 | 62.0 |

In an electrolytic cell with a current intensity of 80,000 amperes, about 360 m.$^3$ (N.T.P.) waste gases are aspirated per hour, yielding 190,000 m.$^3$ from 22 cells in 24 hours with an absorbed amount of HF of 125 kg. in 24 hours. The absorption is adjusted so as to give a solution of about 5% HF. This solution is made available in a storage vessel for the production of cryolite.

In another installation, furnace wastes are leached out with circulating water having room temperature, yielding an alkaline solution with a content of for example, about 40 g./l. Na$_2$CO$_3$, 12 g./l. NaF and 7 g./l. AlF$_3$. From 1 ton furnace wastes, about a thousand liters of such a solution are obtained.

The cryolite is precipitated in the installation shown schematically in Fig. 2 from the HF-solution obtained in the installation of Fig. 1 and from the alkaline leaching solution of the furnace wastes described. The HF-solution is stored in the vessel 10 and the leaching solution in the vessel 13. In the installation of Fig. 2, 8 m.$^3$ of the HF-solution are pumped from the vessel 10 into the reaction vessel 11 and mixed in the latter vessel under stirring with alumina hydrate. The following reaction takes place:

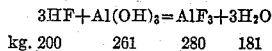
$$3HF + Al(OH)_3 = AlF_3 + 3H_2O$$
kg. 200    261    280    181

The alumina hydrate is added but in such an amount that the remaining HF-excess is sufficient for the formation of enough NaF necessary for the cryolite precipitation by addition of the sodium alkaline leaching solution. The 8 m.$^3$ HF-solution contain 400 kg. HF. By the addition of 260 kg. alumina hydrate, a solution containing 280 kg. AlF$_3$ and 200 kg. HF is formed. This solution is pumped into the precipitating vessel 12.

From the vessel 13 are added 12.6 m.$^3$ leaching solution into the precipitating vessel 12, the following reactions taking place:

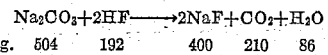
$$Na_2CO_3 + 2HF \longrightarrow 2NaF + CO_2 + H_2O$$
kg. 504    192    400    210    86 and including the amounts of AlF$_3$ (88 kg.) and NaF (151 kg.) added with the leaching solution:

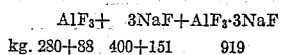
$$AlF_3 + \quad 3NaF + AlF_3 \cdot 3NaF$$
kg. 280+88    400+151    919

After the reaction, the solution shows a pH-value of 5 to 6.

In practice, the reaction runs off with a yield of about 90%, so that 830 kg. cryolite are obtained instead of 919 kg. theoretically.

The cryolite is filtered in the centrifuge 14 and dried in the drying drum 15 at a temperature of about 700° C. The cryolite obtained is very suitable for using in the electrolytic production of aluminum and shows in the average the following composition:

| | |
|---|---|
| H$_2$O | 0.22 |
| SiO$_2$ | 0.37 |
| Fe$_2$O$_3$ | 0.17 |
| Al$_2$O$_3$ | 0.35 |
| Al$_2$(SO$_4$)$_3$ | 0.31 |
| NaF | 58.99 } 97.91 |
| AlF$_3$ | 38.92 |
| CaF$_2$ | 0.20 |
| MgF$_2$ | 0.08 |
| | 99.61 |

According to the above example, in the production of one metric ton of aluminum, about 20 kg. cryolite may be recovered from the waste gases and the furnace wastes available therefrom.

While the invention has been described with particular reference to a specific embodiment, it is to be understood that it is not to be limited thereto, but is to be construed broadly and restricted solely by the scope of the appended claims.

What is claimed is:

1. The process of recovering fluorine from waste gases produced in the electrolytic production of aluminum from a fluoride-containing fused salt bath in an electrolytic cell operated with self-baking anodes, and containing sulphur dioxide and hydrofluoric acid, comprising adding air to the waste gases and burning carbon monoxide and tar products in a combustion chamber, depositing dust and carbon black in a cyclone, cooling the gases to about 40° C.–30° C., washing the waste gases with water, initially containing substantially no solutes, until a solution containing from 3% to 10% hydrofluoric acid is obtained, and reacting said solution with aluminum and sodium containing compounds to precipitate a sodium aluminum double fluoride.

2. A process as in claim 1 wherein the waste gases are drawn off from the washing step by suction.

(References on following page)

References Cited in the file of this patent

UNITED STATES PATENTS

| | | |
|---|---|---|
| 1,873,727 | Specketer et al. | Aug. 23, 1932 |
| 2,031,554 | Torchet | Feb. 18, 1936 |
| 2,186,433 | Von Schwemmer | Jan. 9, 1940 |
| 2,196,077 | Morrow et al. | Apr. 2, 1940 |
| 2,783,128 | Wendt | Feb. 26, 1957 |

FOREIGN PATENTS

| | | |
|---|---|---|
| 4,204 | Great Britain | 1873 |
| 732,746 | Great Britain | June 29, 1955 |
| 875,608 | France | June 29, 1942 |